March 30, 1954
R. J. ALTGELT
2,673,505
LIFT HITCH FOR IMPLEMENTS
Filed March 2, 1951
3 Sheets-Sheet 1
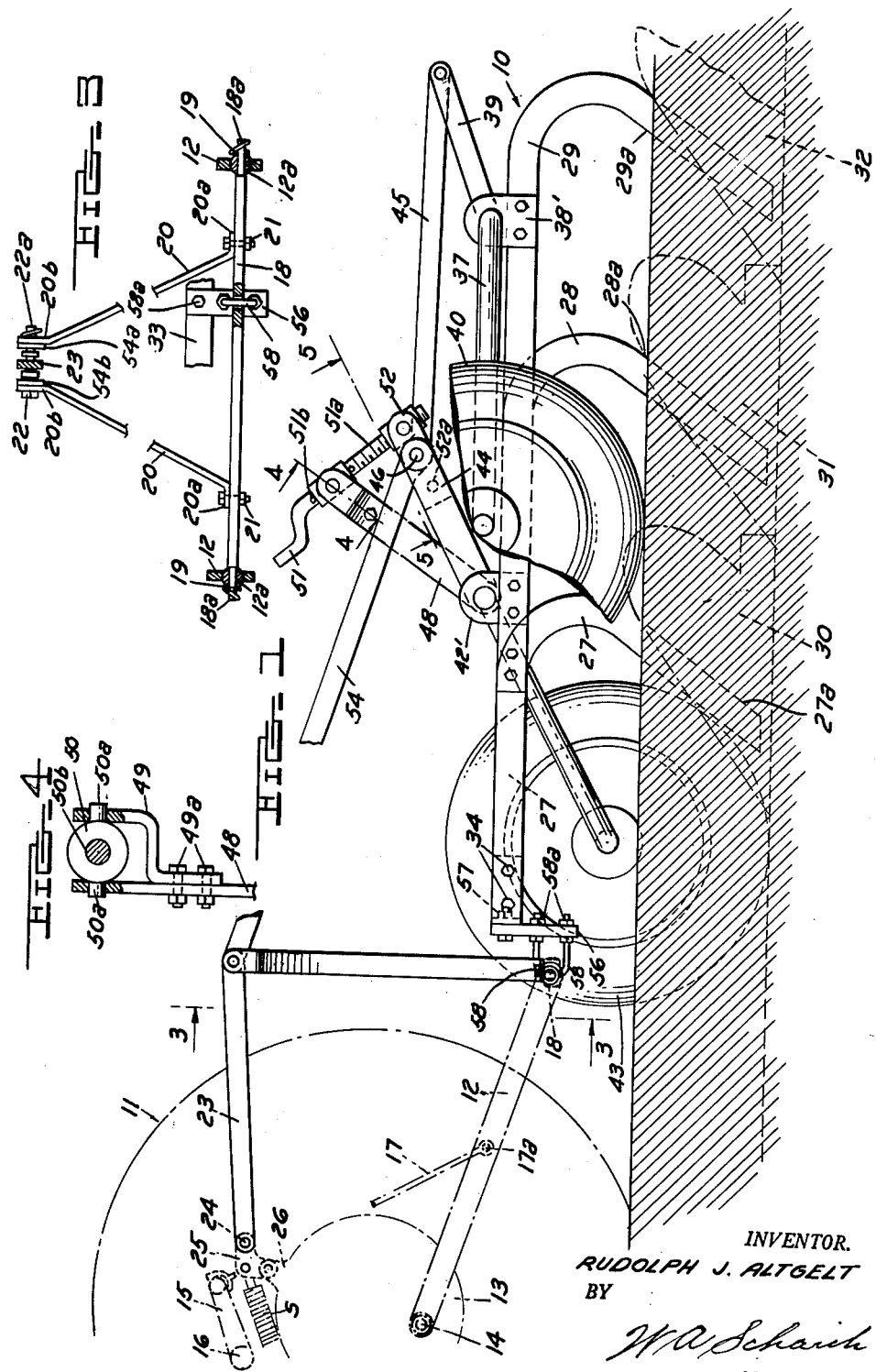
INVENTOR.
RUDOLPH J. ALTGELT
BY
W. A. Schaich
ATTORNEY

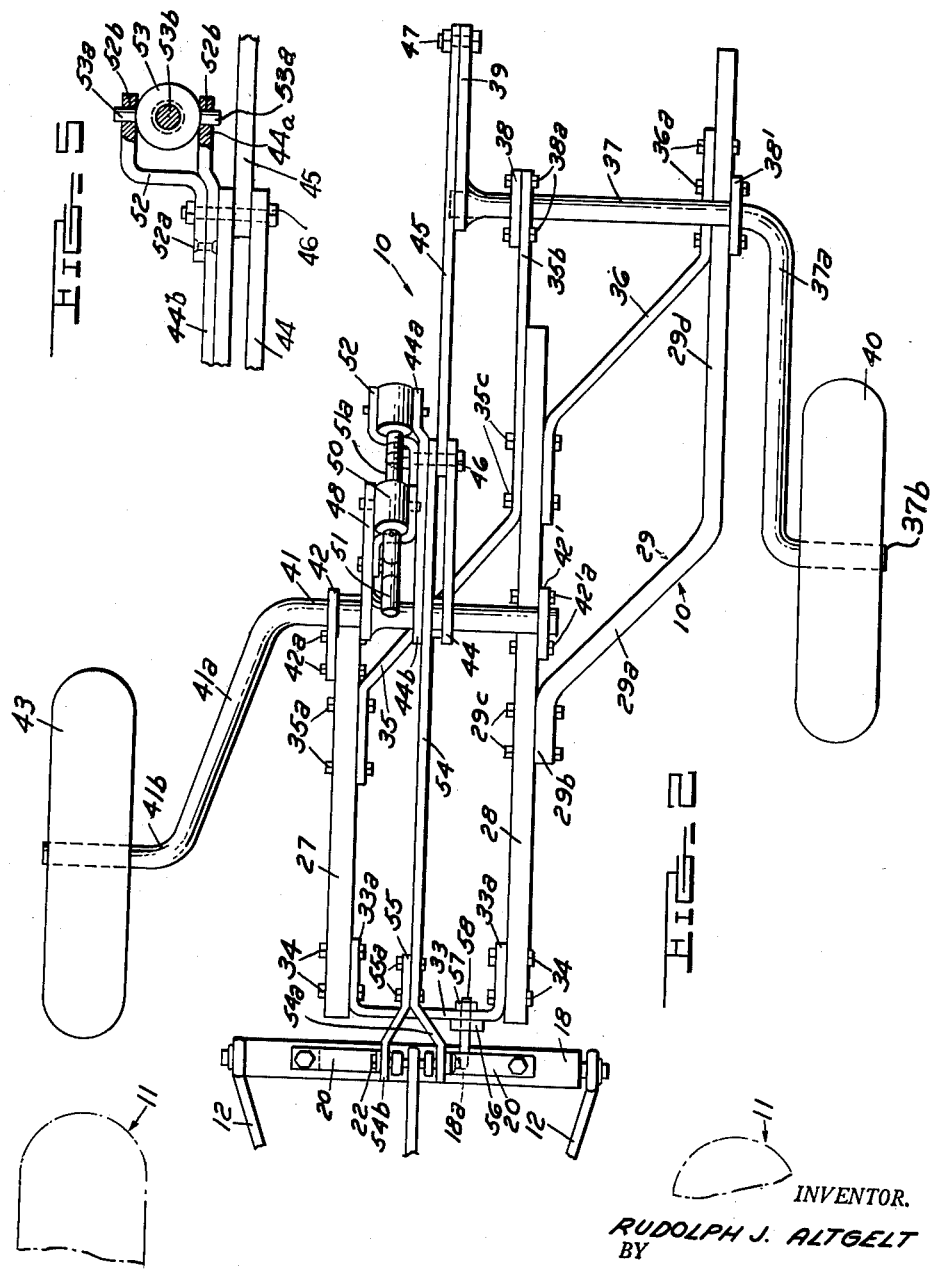

March 30, 1954

R. J. ALTGELT 2,673,505

LIFT HITCH FOR IMPLEMENTS

Filed March 2, 1951

INVENTOR.
RUDOLPH J. ALTGELT
BY
*[signature]*
ATTORNEY

Patented Mar. 30, 1954

2,673,505

UNITED STATES PATENT OFFICE 2,673,505

LIFT HITCH FOR IMPLEMENTS

Rudolph J. Altgelt, South Bend, Ind., assignor to Dearborn Motors Corporation, Birmingham, Mich., a corporation of Delaware Application March 2, 1951, Serial No. 213,580

5 Claims. (Cl. 97—46.07)

This invention relates to an implement lifting device for use with tractors having power lifted trailing hitch links for power lifting of the earth working elements of the implement.

Many modern day tractors have power lifted trailing hitch links which permit close mounting of implements to the tractor and through this arrangement the implements mounted on such hitch links can be raised to a transporting position without manual effort on the part of the tractor operator. The lifting capacity of these power operated hitch links is, however, somewhat limited for lifting any load on the back of the tractor tends to raise the front wheels; hence, generally only implements such as cultivators, two bottom plows and the like can be readily handled by the power lift mechanism for raising such implements to a transporting position. When larger implements such as multiple bottom plows, disc harrows, one way disc plows, seeders, etc. are mounted on the power lifted hitch links of the tractor, the weight of such an implement frequently exceeds the lifting capacity of the power lifting mechanism and hence auxiliary transport wheels or other devices must be resorted to for transporting the plow or other implement.

Wheeled plows have, of course, been in use for a long time and various mechanical devices have been used to raise and lower the plow bottoms to and from a transporting position. There has lately come into use, however, power lifting mechanisms which are hydraulically operated and are mounted on the plow. Pressured fluid is supplied to the hydraulically operated power lifting mechanism from fluid lines connected to a tractor operated pump. This means that there are always fluid conduits trailing from the rear of the tractor to the plow for connection to the hydraulically operated power lifting mechanism. Obviously such fluid lines are troublesome in that they get in the way of the tractor operator when uncoupling the plow from the tractor. Furthermore, there is the everpresent danger of rupturing such lines as when making turns with the plow trailing behind the tractor or upon encountering an obstruction in the ground. Accordingly, this invention contemplates the use of the power lifted hitch links of a well-known type of tractor, in cooperation with one or more transport wheels to effect the raising of very heavy implements, such as a multiple bottom plow. Such arrangement eliminates operator effort, permits close coupling of the implement to the tractor and eliminates bothersome fluid lines.

It is therefore an object of this invention to provide an improved lifting mechanism for a trailed implement operable by the power lifted draft links of a tractor.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a side elevational view showing a multiple base plow incorporating an improved lifting mechanism constructed in accordance with this invention and shown attached to a tractor having power-lifted hitch links.

Fig. 2 is a plan view of the device of Fig. 1.

Fig. 3 is a cross sectional view taken along the plane 3—3 of Fig. 1.

Fig. 4 is an enlarged detail sectional view taken along the plane 4—4 of Fig. 1.

Fig. 5 is an enlarged detail sectional view taken along the plane 5—5 of Fig. 1.

As shown on the drawings:

Figure 6:
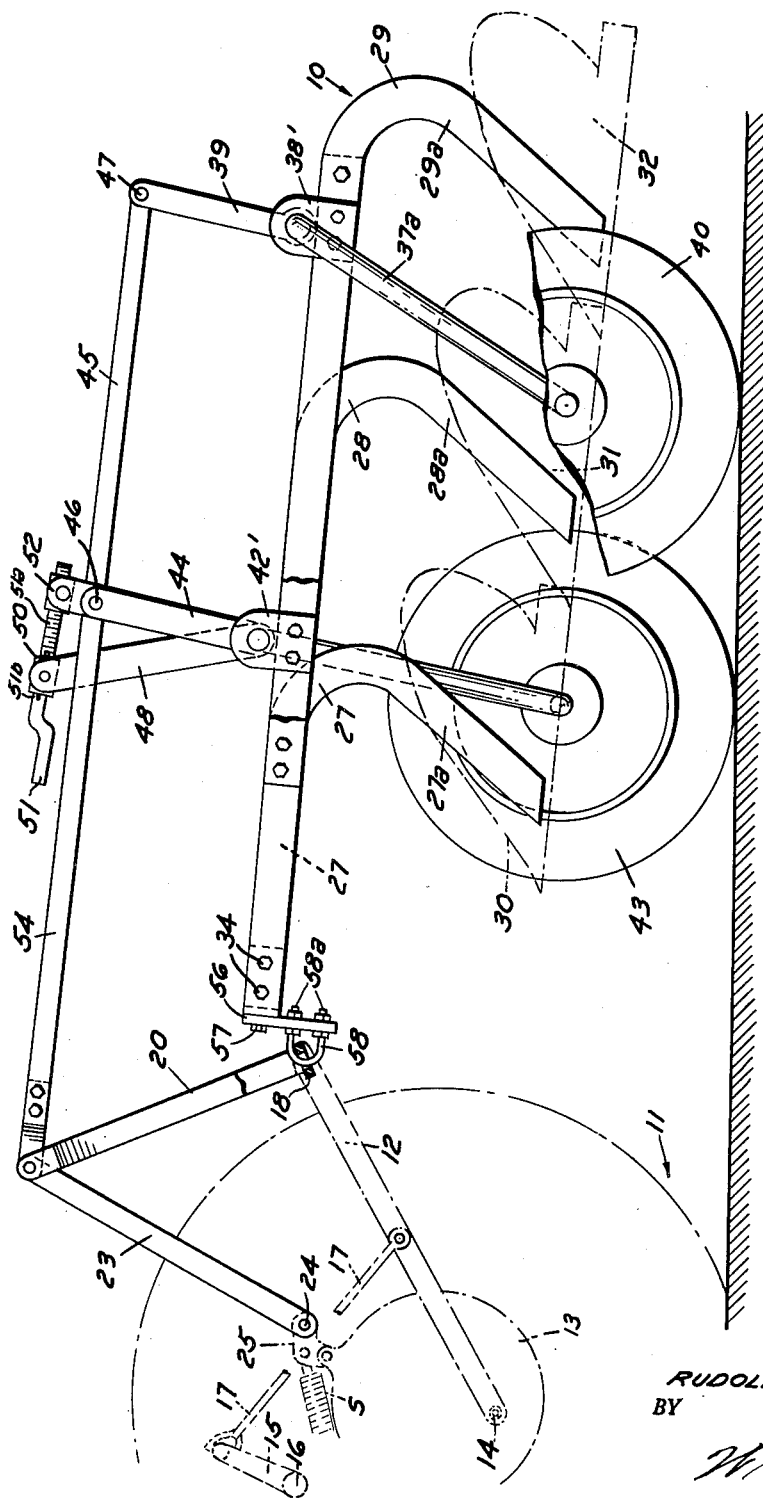
Fig. 6 is a view similar to Fig. 1 but showing the plow bases in a raised transporting position.

In Figures 1 and 2 there is shown, for exemplary purposes, a multiple base plow incorporating a power operated lifting mechanism constructed in accordance with this invention for power lifting the earth working tools. Plow 10 is preferably used with a tractor 11 of well known make having a pair of laterally spaced, trailing, draft links 12 pivoted to the rear axle housing 13 of tractor 11 as shown at 14. Hitch links 12 are vertically lifted by a pair of rocker arms 15 which are respectively secured to the ends of a transverse shaft 16. Shaft 16 is rotated by a built-in hydraulic mechanism (not shown). A pair of connecting links 17 are respectively pivotally connected at one end to the rocker arms 15 and at their other ends to a medial portion of hitch links 12 as shown at 17a. The above described elements of the tractor are all conventional and hence further description thereof is not believed necessary.

The trailing ends of hitch links 12 are respectively provided with a universally swiveling ball joint connection 12a which are apertured to receive pin shaped ends 18a of a rectangular drawbar 18. Drawbar 18 is thus transversely supported by the trailing ends of hitch links 12 and linch pins 19 respectively inserted through suitable apertures in the ends of pins 18a prevent displacement of the hitch links 12 from the ends of pins 18a. A pair of oppositely disposed braces 20 (Fig. 3) having horizontally disposed lower ends 20a are vertically secured to draw bar 18 by a pair of bolts 21 respectively insertable through suitable apertures in the horizontal portion 20a of each brace 20 and through suitable apertures in drawbar 18. Each brace 20 slopes upwardly and inwardly and the upper ends of such braces terminate in vertical portions 20b. The vertical portions 20b are provided with aligned transverse apertures through which there is inserted a transverse headed pin, 22. A linch pin 22a prevents displacement of such pin. Hence braces 20 and drawbar 18 cooperate to define a vertically disposed frame structure commonly referred to as an A frame. Tractor 11 has an upper or top link 23 which is pivoted at 24 to a lug 25 pivotally mounted between a pair of upstanding lugs 26 integrally formed on the top of tractor axle housing 13. The trailing end of top link 23 is pivotally mounted on the transverse pin 22.

While the lift hitch of this invention may be used with many different types of earth working implements, a plow having a plurality of plow bottoms has been selected as an implement to best illustrate the invention. Plow 10 in this instance has three plow beams 27, 28 and 29. Each of the plow beams 27, 28 and 29 has a depending end portion 27a, 28a and 29a on which there is respectively secured a plow bottom 30, 31 and 32. Plow beams 27 and 28 are transversely spaced at their forward ends by a substantially U-shaped bracket 33 (Fig. 2). Bracket 33 has its arms 33a respectively secured to beams 27 and 28 by a plurality of bolts 34 passing through suitable aligned transverse apertures in arms 33a and the plow beams 27 and 28. The rear ends of plow beams 27 and 28 are laterally spaced by a substantially Z-shaped brace 35. Z-brace 35 is secured at its forward end to beam 27 by a pair of bolts 35a while the rear end of brace 35 is secured to beam 28 by a pair of bolts 35c. Brace 35 also projects somewhat beyond the rear end of plow beam 28 as shown at 35b. Plow beam 29 has an offset forward end portion 29a (Fig. 2) which terminates in a longitudinal end portion 29b and such end portion is secured to a medial portion of plow beam 28 by a pair of bolts 29c. The trailing end 29d of plow beam 29 is parallel to the plow beams 27 and 28 and such end of beam 29 is maintained in transversely spaced relationship relative to plow beam 28 by a brace 36. The bolts 35c are utilized for securing the forward end of Z brace 36 to plow beam 28. The rear end of brace 36 is secured to plow beam trailing end 29d by a plurality of bolts 36a. These elements define the main frame structure of the implement.

A depending bar 56 is secured by a longitudinally disposed bolt 57 to the bight portion of bracket 33 and a U bolt 58 effects a pivotal connection between bar 56 and tractor drawbar 18. The U bolt 58 has its bight portion inserted in a selected vertical hole 18a in drawbar 18 and the legs of such U bolt are respectively secured by nuts 58a within a suitable pair of vertically aligned holes provided in bar 56.

A transverse rear axle 37 is mounted adjacent the rear ends of beam 29 and brace extension 35b and such axle is supported by a pair of upstanding bearing brackets 38 and 38'. Bearing bracket 38 is secured to the end of brace extension 35b by a pair of bolts 38a. Bracket 38' is secured to plow beam 29 opposite bracket 38, bolts 36a being also utilized for securing bracket 38' to beam 29 as well as brace 36. The inwardly projecting end of axle 37 has welded thereto a crank arm 39 for a purpose to be later described. The portion 37a of axle 37 projecting out of bracket 38' has a crank-like configuration and is so shaped as to lie adjacent plow beam 29 and be parallel therewith. The outer end 37b of crank portion 37a has a ground wheel 40 rotatably supported thereon. Ground wheel 40 is sufficiently laterally removed from the plow bottoms as to always ride on unplowed ground. The lateral position of furrow wheel 43 relative to the plow bottoms is such that wheel 43 abuts the furrow wall of the preceding furrow. A second front axle 41 is supported transversely of plow beams 27 and 28 by bearing brackets 42 and 42'. Brackets 42 and 42' are respectively secured to beams 27 and 28 by bolts 42a and 42'a. The outwardly projecting end of axle 41 is also of crank-like configuration and is offset as shown at 41a and such offset portion 41a terminates in a transverse end portion 41b on which there is rotatably mounted a furrow wheel 43.

A pair of bars 44 and 44b are pivotally mounted on axle 41 in transversely spaced relationship intermediate the plow beams 27 and 28. A link 45 is pivotally connected at its forward end between the outer ends of bars 44 and 44b by a transverse bolt 46 while the other end of link 45 is pivotally connected to crank arm 39 by a transverse bolt 47.

A crank arm 48 is secured by welding to axle 41 adjacent the inside face of plow beam 27 as best shown in Fig. 2. The crank arm 48 at its upper extremity has an offset strap member 49 (Fig. 4) secured thereto as by bolts 49a and such strap member thereby defines a fork-like end on the end of crank 48. A cylindrical bearing sleeve 50 is pivotally supported between the forked ends of crank arm 48 by a pair of diametrically opposed pins or shafts 50a secured as by welding to bearing sleeve 50; pins 50a being journalled within suitable aligned apertures provided in the forked ends of crank arm 48. Bearing sleeve 50 is provided with an axial bore 50b to rotatably receive the unthreaded portion 51a of crank 51. A pair of pins 51b respectively inserted in suitable apertures in crank 51 adjacent the ends of sleeve 50 prevent axial displacement of the crank relative to sleeve 50.

The bar 44b adjacent the crank arm 48 is provided with an offset upper end portion 44a and there is secured to the upper end of bar 44b an offset strap member 52 to define a forked end portion. Strap member 52 is secured to bar 44b by a rivet 52a and by the bolt 46 which pivotally mounts link 45 between the bars 44, as best shown in Fig. 5. A bearing sleeve 53 similar to bearing sleeve 50 is similarly pivotally mounted in the forked end defined by strap 52 and bar 44b. Bearing sleeve 53 is provided with an axially threaded hole 53b and the threaded end portion of crank 51 is threadably engaged in such hole.

A link 54 is pivotally mounted at its rear end on the bolt 46 on which bars 44 and 44b and link 45 are also pivotally mounted. The forward end of link 54 is offset as shown at 54a and a strap 55, similarly offset, is secured to the offset end of link 54 by bolts 55a to define a forked end portion 54b. The forked end 54b is pivotally mounted upon headed pin 22 which is also utilized to mount top link 23 between the upright braces 20.

Crank arms 39 and 48 are so positioned on their respective axles as to permit the wheel 40 to normally rest on the ground surface while the wheel 43 rides on the bottom of the furrow previously formed as shown in Fig. 1. In order to raise the plow bottoms out of the ground, the hitch links 12 are raised by the hydraulic control lever (not shown) on the tractor which actuates the hydraulically operated rocker arms 15 to thereby raise such links. Upper link 23 is then moved upwardly in an arcuate path thus pulling links 45 and 54 forwardly thereby respectively rotating crank arms 39 and 48 in a counter-clockwise direction as shown in Fig. 1 which in effect rotates axles 37 and 41 about their respective wheels 40 and 43. This movement raises the plow beams 27, 28 and 29 upwardly and lifts the plow bottoms out of the ground so that substantially all of the weight of the plow rests on the wheels 40 and 43. The front end of the plow is, of course, also lifted by the hitch links 12 through the connection of drawbar 18 to the U-shaped bracket 33 by the U bolt 58. Lowering the hitch links 12 reverses the operation and the plow bottoms will then drop into the ground to their normal plowing position. The furrow depth may be conveniently controlled by manipulation of the tractor's hydraulic control lever (not shown) to raise or lower the hitch links 12 until the desired plowing depth is obtained.

It will be noted from a comparison of the relative positions of the wheels 40 and 43 with respect to the plow bottoms in the transport and the working positions that the ground wheel 40 must be shifted vertically with respect to the plow bottoms to a substantially greater extent than the furrow wheel 43 during rotation of the crank axles of such wheels when the plow is raised to its transport position. Such difference in extent of relative vertical movement of the wheels 40 and 43 may be conveniently obtained by suitable proportioning of the length of the crank arms 39 and 48 and also by proper selection of the relative angular positions of the crank axles 37 and 41 with respect to the crank arms 39 and 48.

The vertical positions of the various plow bottoms and hence the furrows turned by the plow bottoms, may be leveled relative to one another by turning crank handle 51. As bars 44 and 44b are relatively fixed in position by links 54 and 45, crank arm 48 will then be rotated by moving crank 51 which increases or decreases the angular relationship between crank arm 48 and bars 44 and 44b depending upon the direction of movement of crank 51. Thus the plow beams will be vertically tilted about a longitudinal axis for adjustment to a desired level.

Considering the operation of the above described lifting mechanism in general it will be noted that the essential structure constitutes a generally vertically disposed secondary frame, such as the A-frame defined by the braces 29 and drawbar 18 which is pivotally connected at one of its vertical extremities to the power lifted hitch links of the tractor and is pivotally connected at the other of its vertical extremities to the positioning hitch link of the tractor. The main frame of the implement is also pivotally connected to the secondary frame. With such construction, the raising and lowering of the tractor hitch links produces a change in the angular position of the secondary frame with respect to the main frame of the implement, and such change in angular position is utilized to operate the crank axles, through the connecting links 54 and 45, to concurrently effect the pivoting of the wheels 40 and 43 to their transport positions with respect to the implement frame. Hence, at no time do the hitch links of the tractor support the entire weight of the implement but instead, the tractor hitch links merely support a portion of the weight of the implement frame and supply the power for pivoting the crank axles to shift the wheels to their transport positions.

From the above description it is clearly apparent that there is here provided an improved power operated implement lifting mechanism for use with a tractor having power lifted hitch links which permits rapid and convenient lifting and lowering of the ground working tools of an implement and will accommodate much heavier implements than was heretofore possible. The arrangement enables the implement to be quickly and conveniently attached to the tractor and by utilizing only the power operated hitch links of the tractor the trailing fluid conduits commonly utilized to lift many wheel type implements are entirely eliminated.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a pair of power-lifted hitch links and a top link pivoted to the tractor, a plow frame including a plurality of laterally spaced plow beams having plow bottoms secured thereon, means for pivotally mounting the hitch links on the forward end of said plow frame, an upright bracket mounted on the front of said plow frame, means pivotally connecting the top link to said bracket, a first and a second axle rotatably mounted on said plow frame in longitudinally spaced relation, said first and second axles having crank-like end portions respectively disposed on opposite sides of said plow frame, a furrow wheel and a ground wheel respectively mounted on said end portions, a first and a second lever secured respectively to said first and second axles, an arm rotatably mounted on said first axle, an adjustable length connection between said first lever and said arm, a first link pivotally connected between said second lever and said arm, and a second link pivotally connected to said first link and the top portion of said bracket, whereby raising of the hitch links effects movement of said first and second links to rotate said first and second axles to elevate said plow frame.

2. For use with a tractor having a pair of power-lifted hitch links and a tip link pivoted to the tractor, a pair of longitudinally aligned articulated sub-frames, means for pivotally mounting the hitch links and top link at vertically spaced points of one of said sub-frames for relative vertical movement, a pair of axles rotatably mounted on the other of said sub-frames having crank ends, a pair of wheels respectively mounted on said axle crank ends, a lever secured to each of said axles, and link members interconnecting said levers and said top link mounting means of said first sub-frame, whereby raising of the hitch links to elevate the first named sub-frame effects rotation of said crank ends for elevating said other of said sub-frames.

3. For use with a tractor having a pair of power-lifted hitch links and a top link pivoted to the tractor, an A-frame, means for pivotally mounting the hitch links and the top link at vertically spaced points on said A-frame, an implement frame, means connecting said implement frame to said A-frame for relative movement, a pair of axles rotatably mounted on said implement frame, respectively, having crank ends disposed on opposite sides of said frame, a furrow wheel and a ground wheel respectively secured to said axles, linkage means pivotally connecting said levers to the top link connection point on said A-frame, whereby raising of the hitch links rotates said crank ends of said axles for elevating said frame above said wheels, and manually operable means for angularly shifting one of said levers independently of said linkage means for adjustably elevating one of said wheels for leveling said frame.

4. For use with a tractor having a pair of power-lifted hitch links and a top link pivoted to a tractor in vertically spaced relation, an A-frame connecting the vertically spaced trailing ends of said hitch links and said top link, an implement frame pivotally connected to said A-frame intermediate said hitch links and trailing therebehind, a pair of axles rotatably mounted on said implement frame and having crank ends, a pair of wheels respectively rotatably mounted on said axle crank ends, a lever secured to each of said axles, and link elements interconnecting said levers and pivotally attached at the point of attachment of said top link to said A-frame, whereby raising of said hitch links to elevate the A-frame effects rotation of said axles to elevate said implement frame upon said wheels.

5. For use with a tractor having a pair of trailing hitch links pivotally mounted for vertical movement about vertically spaced pivot points and power means for elevating one of said links, a plow comprising a first frame having vertically spaced upper and lower portions attachable to the trailing ends of said hitch links for vertical movement upon actuation of said power means, the upper portion of said first frame being tilted toward the tractor upon elevation thereof, a second frame pivotally attached to the lower portion of said first frame and including a plurality of depending longitudinally and laterally spaced plow units, a first wheel support vertically adjustably mounted on said second frame and disposed to overlie the plow furrow in advance of the foremost plow unit, a second wheel support vertically adjustably mounted on said frame and disposed to overlie the unplowed land laterally adjacent said plow units, an adjustable length link operatively interconnecting said wheel supports, thereby controlling the relative heights of said wheel supports for leveling of said plow units, and means for concurrently vertically shifting said wheel supports as a function of said tilting movement of said upper frame, thereby controlling the effective height of said plow units relative to the ground.

RUDOLPH J. ALTGELT.

References Cited in the file of this patent

UNITED STATES PATENTS

| Number | Name | Date |
|---|---|---|
| 1,637,811 | Ferguson | Aug. 2, 1927 |
| 2,098,472 | Strandlund | Nov. 9, 1937 |
| 2,386,378 | Wippel | Oct. 9, 1945 |
| 2,412,362 | Silver | Dec. 10, 1946 |
| 2,608,145 | Knapp | Aug. 26, 1952 |

FOREIGN PATENTS

| Number | Country | Date |
|---|---|---|
| 473,798 | France | Oct. 15, 1914 |
| 503,186 | France | Mar. 10, 1920 |